United States Patent [19]
Palmer et al.

[11] 4,023,851
[45] May 17, 1977

[54] MODULAR OPERATOR'S COMPARTMENT FOR TRACTORS

[75] Inventors: Richard D. Palmer; Jack R. Barr; Thomas E. Hrodey, all of Decatur, Ill.

[73] Assignee: Caterpillar Tractor Co., Peoria, Ill.

[22] Filed: Feb. 19, 1974

[21] Appl. No.: 443,510

[52] U.S. Cl. .......................... 296/28 C; 180/89.12; 296/102
[51] Int. Cl.² ...................................... B62D 27/04
[58] Field of Search ............. 296/28 R, 28 C, 102, 296/35 A, 37 R; 180/89 R; 280/150 C; 214/DIG. 7

[56] References Cited
UNITED STATES PATENTS

| | | | |
|---|---|---|---|
| 789,961 | 5/1905 | Call | 296/35 A |
| 1,071,348 | 8/1913 | Rice | 296/37 R |
| 2,529,200 | 11/1970 | Swanson | 296/28 C |
| 3,279,843 | 10/1966 | Hafer et al. | 296/28 C |
| 3,287,058 | 11/1966 | Wells | 296/37 R |
| 3,397,008 | 8/1968 | Timmerman | 296/28 C |
| 3,451,713 | 6/1969 | Hollingshead | 296/28 C |
| 3,572,819 | 3/1971 | Moore | 296/102 |
| 3,732,941 | 5/1973 | Davis et al. | 180/89 R |
| 3,787,085 | 1/1974 | Bucher et al. | 296/28 C |
| D142,761 | 10/1945 | Zeiler | 296/28 C X |

OTHER PUBLICATIONS

"In the Service of the Trade", *Motor Vehicle Monthly*, Aug., 1924, p. 64, vol. 60, No. 5.

*Primary Examiner*—Robert J. Spar
*Assistant Examiner*—Donald W. Underwood
*Attorney, Agent, or Firm*—Phillips, Moore, Weissenberger, Lempio & Majestic

[57] ABSTRACT

An operator's compartment comprises a unitized frame structure comprising forward, rearward and bottom sections having a plurality of cover panels secured thereon. An operator's seat is mounted on the bottom section, adjacent to the rearward section, and a dash panel is mounted interiorly on the forward section. A first securance system is formed on the bottom section to attach the operator's compartment to a frame of a vehicle and a second securance system is formed on the forward and rear sections to secure various types of covering structures thereon, such as a roll-over protective structure.

5 Claims, 8 Drawing Figures

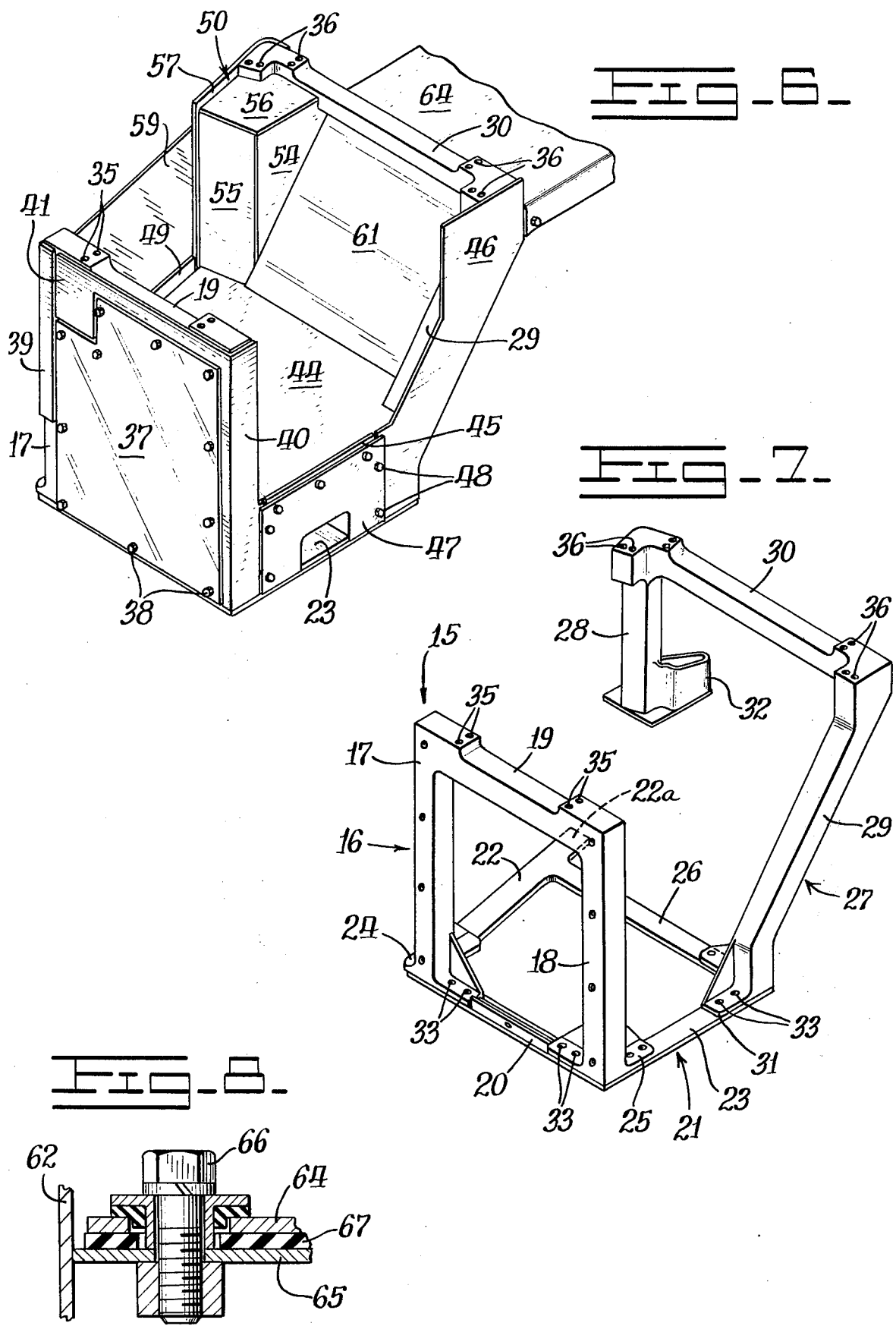

MODULAR OPERATOR'S COMPARTMENT FOR TRACTORS

BACKGROUND OF THE INVENTION

The operator's compartment of a conventional tractor or the like is normally equipped with a structure such as a roll-over protective structure, an environmental cab or a windshield. The installation or replacement of such a structure normally requires complete removal of the original operator's station, including its associated operator's controls for the tractor, and a complete reworking thereof or a replacement therefor. Such procedure is time consuming and costly and does not always provide the operator's compartment with a high degree of structural integrity and operator safety. In addition, a conventional operator's compartment is normally structurally integrated into the framework of a vehicle by welds and the like, thus making it difficult to remove the same should such become necessary.

SUMMARY OF THIS INVENTION

An object of this invention is to overcome the above, briefly described problems by providing a modular operator's compartment for tractors and the like which is adapted for expeditious attachment of a structure thereon and expeditious removal of the compartment should such become necessary. The compartment comprises an open sided and unitized frame structure having an upstanding and generally rectangular forward section, a horizontally disposed bottom section and a rearward section. A plurality of cover panels are secured on the frame structure, an operator's seat is mounted on the bottom section and a dash panel is mounted interiorly on the forward section. First securance means are formed on the bottom section to adapt it for securance to the frame of a vehicle and second securance means are formed on the forward and rearward sections to adapt it for securance to a roll-over protective structure, for example.

BRIEF DESCRIPTION OF THE DRAWINGS

Other objects of this invention will become apparent from the following description and accompanying drawings wherein:

FIG. 6 is an isometric view of a partially assembled operator's compartment;

FIG. 7 is an isometric view of a frame structure employed in the operator's compartment; and FIG. 8 is an enlarged sectional view taken in the direction of arrows VIII—VIII in FIG. 5.

DETAILED DESCRIPTION

Figure 1:
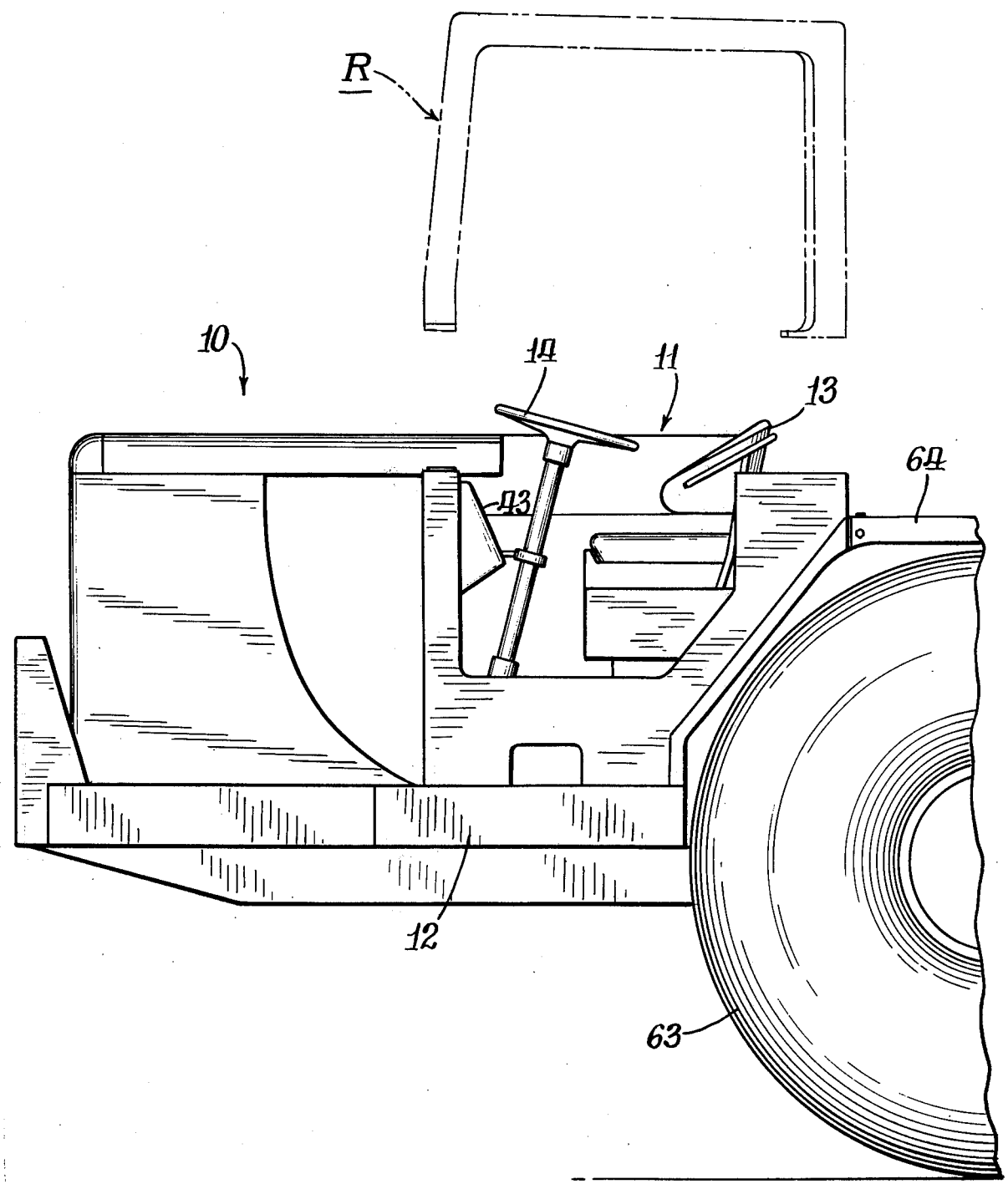
FIG. 1 is a side elevational view of the front portion of a tractor unit having the modular operator's compartment of this invention mounted thereon and showing a roll-over protective structure in phantom lines which is adapted to be attached on the operator's compartment.

FIG. 1 illustrates the front end of a vehicle 10, such as a tractor unit, having a modular operator's compartment 11 mounted on a frame 12 thereof. As will be hereinafter more fully described, the operator's compartment includes a seat 13 and a steering wheel 14 adapted to have various covering structures mounted thereover, such as a roll-over protective structure R. Referring to FIG. 7, the operator's compartment comprises an open-sided and unitized frame structure 15 having an upstanding and generally rectangular forward section 16. The forward section comprises a pair of vertically disposed and laterally spaced members or box sections 17 and 18 secured together by an upper member or box section 19 and a lower member 20.

The frame structure further comprises a horizontally disposed and generally rectangular bottom section 21 having laterally spaced members 22 and 23 thereof secured at their forward ends beneath foot members 24 and 25 of forward section members 17 and 18, respectively. The bottom section further comprises a rearward member 26 secured, along with member 23, to a lower end of an upstanding rearward section 27. The rearward section forms a generally inverted U-shaped configuration comprising laterally spaced and upstanding members or box sections 28 and 29 secured together at their upper ends by a cross-member or box section 30.

The lower end of member 29 terminates at a foot portion 31 secured to a corner of bottom section 21, formed at the intersection of member 23 and 26 thereof. A second foot portion 32 is formed on the lower end of member 28 to adapt it for attachment to frame 13 at a position higher than foot portion 31. Unless indicated otherwise, the term "secured" as used herein shall mean that welds or the like are employed to secure the various sections, members and/or panels together.

Figure 2:
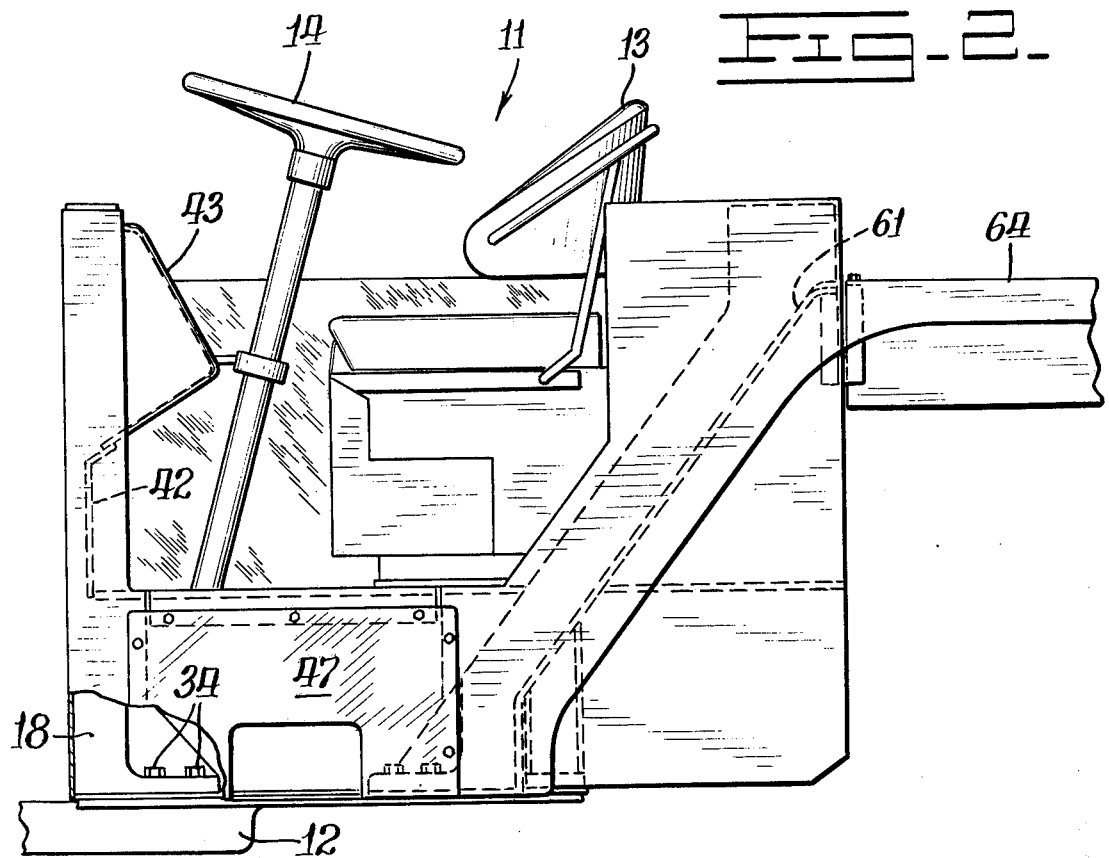
FIG. 2 is an enlarged, partially sectioned left side elevational view of the operator's compartment.

The bottom section has first securance means, such as bolt receiving apertures 33, formed therethrough to secure the frame structure to frame 12 of the vehicle by bolts 34 (FIG. 2). Second securance means, such as threaded bolt receiving apertures 35 and 36, are respectively formed on vertically raised flat surface portions of members 19 and 30. Threaded apertures 35 and 36 are thus adapted to receive bolts therein to secure a structure to the operator's compartment, such as roll-over protective structure R of FIG. 1.

Figure 4:
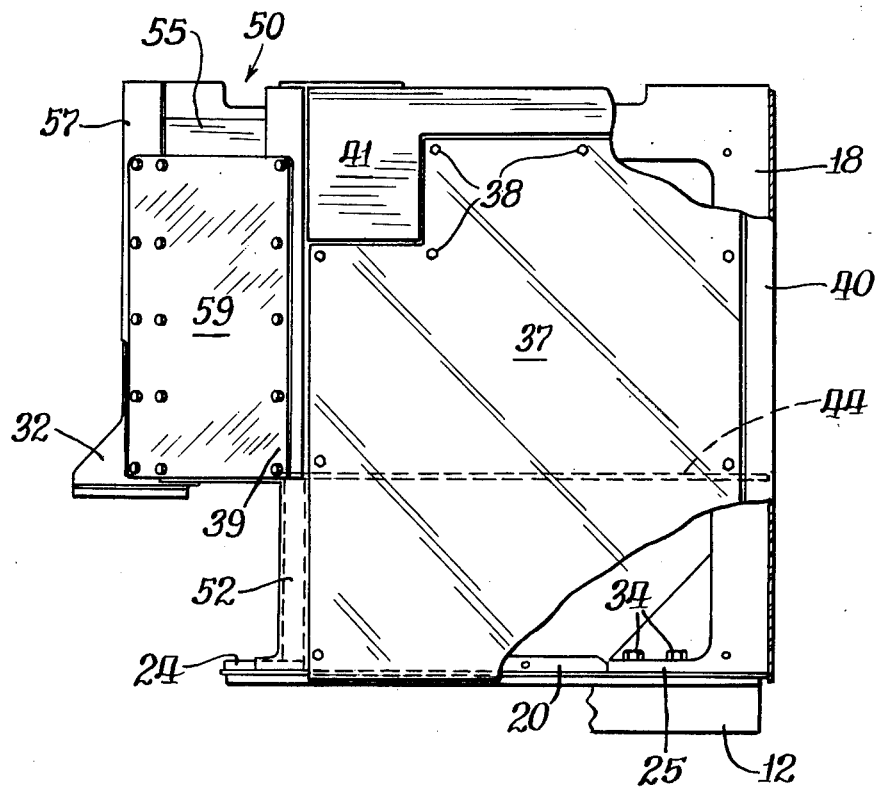
FIG. 4 is a partially sectioned, front elevational view of the operator's compartment.
Figure 5:
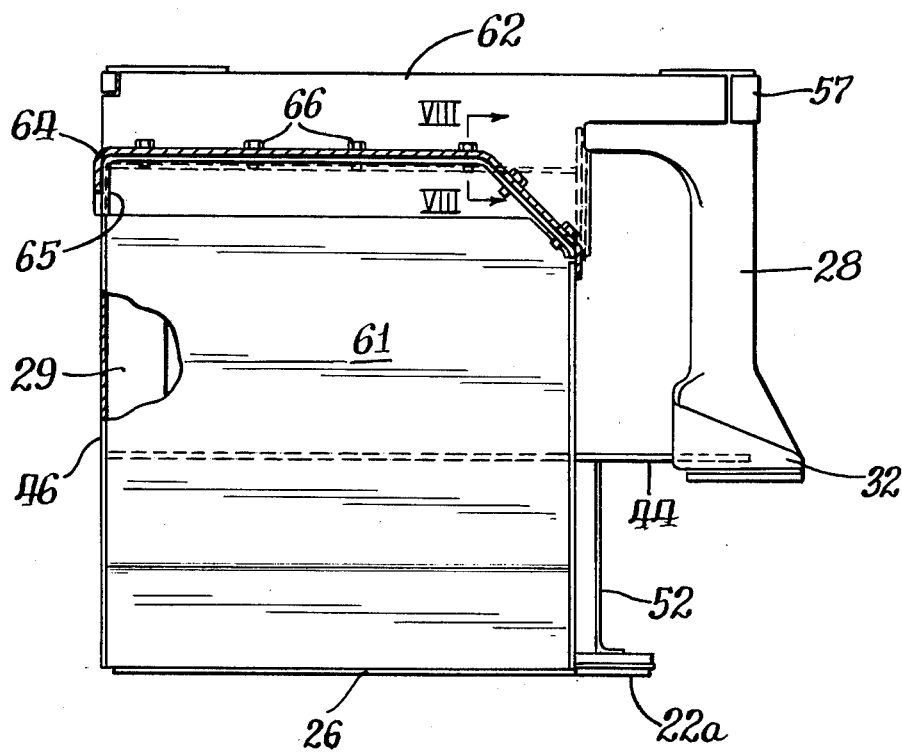
FIG. 5 is a partially sectioned, rear elevational view of the operator's compartment.

FIGS. 4–6 illustrate frame structure 15 of FIG. 7 having a plurality of cover panels secured thereon to substantially cover the same. A cover panel 37 is removably attached to the exterior of forward section 16 by a plurality of cap screws 38 to provide ready access to control apparatus housed therebehind. Channel bars 39 and 40 are welded to members 17 and 18, respectively, whereas an L-shaped panel 41 is secured exteriorly on members 17 and 19. As shown in FIG. 2, a fire wall 42 of limited height is secured interiorly, between members 17 and 18, and a dash panel 43 is attached interiorly on the forward section, above the fire wall.

Figure 3:
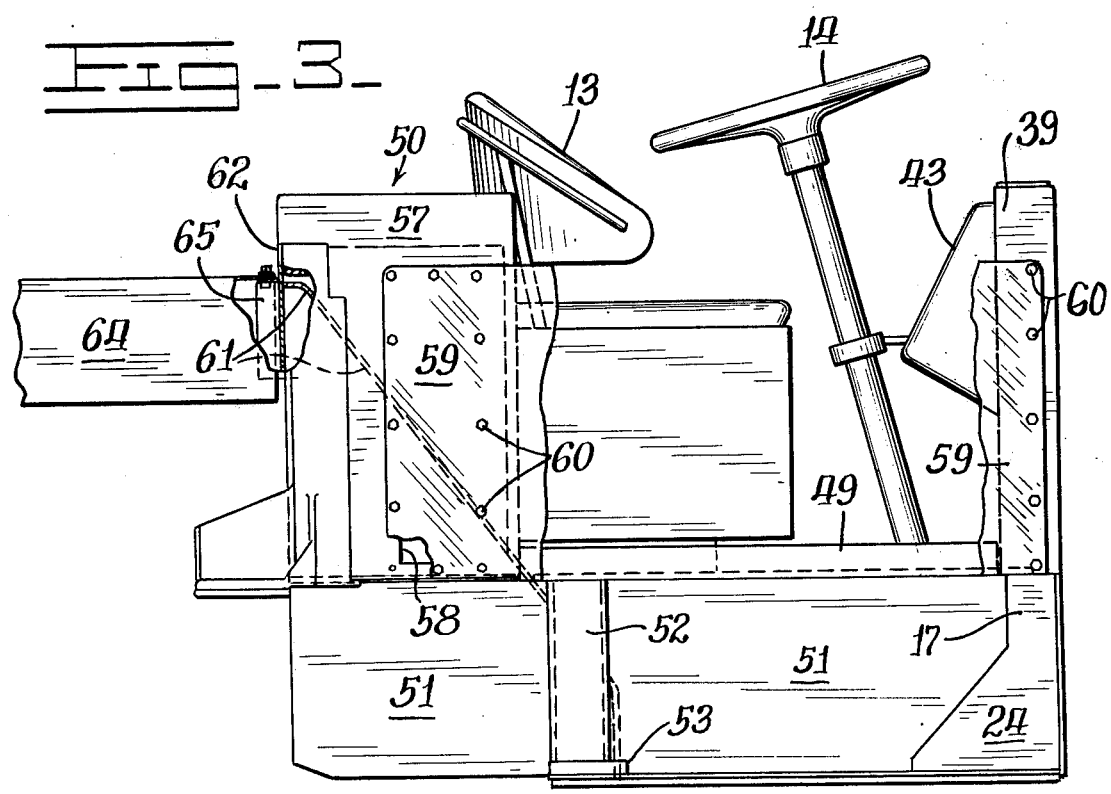
FIG. 3 is a partially sectioned, right side elevational view of the operator's compartment.

Referring to FIG. 6, a floor panel 44 is secured on the bottom section along with a plate bar 45 and a side panel plate 46 which is also secured to member 29. A removable cover panel 47, having a foot rest formed therethrough, is attached on a side of the bottom section by cap screws 48 to provide ready access to working components (not shown) disposed beneath panel 44. As shown in FIG. 3, the opposite side of the bottom section has a rail 49 welded to channel 39 and the housing of a control console 50.

A side panel 51 is secured on the right side of the bottom section, between panel 44 and member 17 and 22. A vertically disposed reinforcing strut 52 is welded at its upper end to panel 44 and terminates at its lower end at a foot portion 53, secured to the upper surface of a rearward extension 22a of member 22 (FIGS. 3 and 7). Referring to FIGS. 3 and 6, the housing for control console 50 comprises panels 54, 55, 56 and 57 secured together and also to the bottom and rearward sections of frame structure 15.

A rectangular opening 58 is formed through panel 57 and is normally covered by a panel 59 removably attached thereon by cap screws 60. The rearward section of the frame structure is closed by a panel 61 secured laterally between member 29 and panels 46 and 51. Panel 61 is secured at its upper end (FIG. 3) to a back cover panel 62 and extends downwardly and forwardly towards the forward section of the frame structure and has its lower end secured to bottom section 21 thereof.

Panel 61 reinforces the rearward end of the operator's compartment and also defines a forward end of a fender well for a wheel 63 (FIG. 1). The fender well is further defined by a fender 64 attached to a like-shaped flange 65, by cap screws 66, secured on a rearward side of panel 62. A rubber strip 67 may be mounted between fender 64 and mounting flange 65 to prevent metal-to-metal contact therebetween (FIG. 8).

We claim:

1. A modular operator's compartment for a vehicle comprising an open-sided and unitized frame structure having an upstanding and generally rectangular forward section, a horizontally disposed and generally rectangular bottom section secured at its forward end to a lower end of said forward section and an upstanding rearward section secured at its lower end to a rearward end of said bottom section, plurality of cover panels mounted on said frame structure to substantially cover the same, an operator's seat mounted on said bottom section, adjacent said rearward section, to face said forward section, a dash panel mounted interiorly on said forward section, first securance means on said bottom section for removably securing said frame structure to a frame of a vehicle, and second securance means on each of said forward and rearward sections for removably securing a covering structure over said operator's compartment, said compartment being releasably attached on a frame of a vehicle by releasable fastening means engaging said first securance means, said cover panels including a cover panel removably attached to the exterior of said forward section by means of removable fastening means for providing access behind said dash panel, said rearward section comprising a first upstanding member secured at its lower end to a corner of said bottom section, a cross-member having its first end secured on an upper end of said first upstanding member and a second upstanding member having its upper end secured to a second end of said cross-member, the lower end of said second upstanding member being shorter than said first upstanding member and terminating short of said bottom section in unattached relationship therewith.

2. The compartment of claim 1 wherein said cover panels comprise a floor panel secured on said bottom section and a panel removably attached to a side of said bottom section to provide access beneath said floor panel.

3. The compartment of claim 1 further comprising a control console housing secured to said bottom and rearward sections and wherein said cover panels comprise a panel removably attached to a side of said console.

4. The compartment of claim 1 wherein each of said second securance means comprises a threaded bolt receiving aperture formed on a vertically raised flat surface portion formed on said forward and rearward sections.

5. The compartment of claim 1 wherein said cover panels comprise a panel secured on said frame structure to extend from an upper end of said rearward section downwardly and forwardly towards said forward section and a fender secured to an upper end of said rearward section to extend rearwardly therefrom to define a fender well covering a road wheel rotatably mounted on a vehicle.

* * * * *